US008369859B2

(12) United States Patent
Claussen et al.

(10) Patent No.: US 8,369,859 B2
(45) Date of Patent: Feb. 5, 2013

(54) CONTROLLING TRANSMIT POWER OF PICOCELL BASE UNITS

(75) Inventors: Holger Claussen, Swindon (GB);
Hamid Reza Karimi, Swindon (GB);
Lester Tse Wee Ho, Swindon (GB);
Louis Gwyn Samuel, Swindon (GB)

(73) Assignee: Alcatel Lucent, Paris (FR)

( * ) Notice: Subject to any disclaimer, the term of this patent is extended or adjusted under 35 U.S.C. 154(b) by 1075 days.

(21) Appl. No.: 11/438,475

(22) Filed: May 22, 2006

(65) Prior Publication Data
US 2007/0270151 A1 Nov. 22, 2007

(51) Int. Cl.
*H04W 40/00* (2009.01)
*H04W 16/24* (2009.01)

(52) U.S. Cl. ............. 455/449; 455/522; 455/456.3; 455/67.13

(58) Field of Classification Search ............. 455/449, 455/522, 447, 448, 69, 404.2, 521, 456.1, 455/452.1, 456.3, 67.11, 67.13; 370/342
See application file for complete search history.

(56) References Cited

U.S. PATENT DOCUMENTS

| | | | |
|---|---|---|---|
| 5,822,696 A | 10/1998 | Bergkvist | |
| 6,035,208 A * | 3/2000 | Osawa | 455/522 |
| 6,088,335 A | 7/2000 | I et al. | |
| 6,101,176 A | 8/2000 | Honkasalo et al. | |
| 6,115,596 A * | 9/2000 | Raith et al. | 455/404.2 |
| 6,438,379 B1 * | 8/2002 | Gitlin et al. | 455/449 |
| 6,449,462 B1 | 9/2002 | Gunnarsson et al. | |
| 6,473,624 B1 * | 10/2002 | Corbett et al. | 455/522 |
| 6,754,251 B1 | 6/2004 | Sriram et al. | |
| 6,845,246 B1 | 1/2005 | Steer | |
| 6,850,500 B2 | 2/2005 | Zeira et al. | |

(Continued)

FOREIGN PATENT DOCUMENTS

| | | |
|---|---|---|
| CN | 1407816 A | 4/2003 |
| EP | 0559949 A2 | 9/1993 |
| EP | 1565017 A2 | 8/2005 |
| JP | 2002305477 A | 10/2002 |
| KR | 20040034962 A | 4/2004 |

OTHER PUBLICATIONS

International Preliminary Report on Patentability for International application No. PCT/US2007/011366 mailed Dec. 11, 2008.

(Continued)

*Primary Examiner* — John J Lee
(74) *Attorney, Agent, or Firm* — Carlson, Gaskey & Olds PC

(57) ABSTRACT

A transmit power control technique within a wireless communication system includes adjusting a transmit power used by a picocell base station unit based upon a position of the picocell within a macrocell. When a picocell base station unit is located relatively close to a macrocell base station or center of the macrocell, the transmit power of the picocell base station unit is increased to avoid downlink interference from the macrocell base station for mobile stations communicating within the picocell. When a picocell base station unit is located relatively close to an edge of a macrocell, the transmit power of the picocell base station is decreased to avoid interference caused by the picocell base station unit for mobile stations communicating within the macrocell in the vicinity of the picocell. In a disclosed example determined downlink interference levels provide an indication of the position of the picocell within the macrocell and provide an indication of how to automatically adjust the transmit power of the picocell base station unit.

9 Claims, 1 Drawing Sheet

U.S. PATENT DOCUMENTS

| | | |
|---|---|---|
| 6,944,426 B1 | 9/2005 | Esser et al. |
| 7,142,861 B2 * | 11/2006 | Murai ........................ 455/444 |
| 7,260,415 B1 | 8/2007 | Oh |
| 7,444,162 B2 | 10/2008 | Hassan |
| 7,593,332 B2 | 9/2009 | Kwon |
| 7,623,857 B1 | 11/2009 | O'Neil et al. |
| 2003/0086398 A1 | 5/2003 | Hiltunen |
| 2004/0105406 A1 | 6/2004 | Kayama et al. |
| 2004/0147276 A1 | 7/2004 | Gholmieh |
| 2004/0252666 A1 | 12/2004 | Johnson |
| 2006/0019665 A1 | 1/2006 | Aghvami et al. |
| 2006/0165032 A1 | 7/2006 | Hamalainen et al. |
| 2007/0253363 A1 | 11/2007 | Bachl et al. |
| 2007/0270151 A1 | 11/2007 | Claussen et al. |
| 2008/0069028 A1 | 3/2008 | Richardson |
| 2008/0101301 A1 | 5/2008 | Thomas et al. |
| 2008/0260000 A1 | 10/2008 | Periyalwar et al. |

OTHER PUBLICATIONS

International Search Report and Written Opinion of the International Searching Authority for International application No. PCT/US2007/011366 mailed Feb. 14, 2008.

Haas H et al: "Capacity Analysis of a TDD Underlay Applicable for UMTS," IEEE International Symposium on Personal, Indoor and Mobile Radio Communications. PIMRC, vol. 1, Sep. 12, 1999, five pages.

International Preliminary Report on Patentability for International Application No. PCT/.US2007/024847 mailed Apr. 7, 2009.

International Search Report and Written Opinion of the International Searching Authority for International Application No. PCT/US2007/024847 mailed Jun. 20, 2008.

* cited by examiner

CONTROLLING TRANSMIT POWER OF PICOCELL BASE UNITS

FIELD OF THE INVENTION

This invention generally relates to communication. More particularly, this invention relates to wireless communications.

DESCRIPTION OF THE RELATED ART

Wireless communication systems are well known and in widespread use. Many systems are so-called cellular systems because of the way that wireless communication coverage is designed. Base station transceivers are arranged to provide wireless communication coverage over geographic areas surrounding the base station. The geographic area is typically referred to as a cell. Because of their typically large size or coverage area, such cells are sometimes referred to as macrocells.

It is possible to establish smaller-sized cells within a macrocell. These are sometimes referred to as picocells. One proposed way for establishing a picocell is to provide a home base station unit that operates within a relatively limited range such as within a building, for example.

Various challenges are introduced by the possibility of having one or more picocell base station units within a macrocell. For example, there can be mutual downlink co-channel interference between a picocell base station unit and a macrocell base station. This may occur when both cells are using the same frequency or channel for downlink communications.

For example, a mobile station within a picocell and communicating with a picocell base station unit can suffer from interference when the picocell base station unit is located near the macrocell base station. This occurs because such a mobile station is exposed to the impact of transmissions from the macrocell base station. If the distance between the picocell base station unit and the macrocell base station is small enough, the service to the picocell mobile station may become unacceptable.

On the other hand, a mobile station within the macrocell may suffer from interference when it is located near a picocell base station unit and is the vicinity of an edge of coverage of the macrocell. Under such circumstances, a mobile station is exposed to the impact of the picocell base station unit transmissions while receiving relatively weak signals from the macrocell base station. Therefore, the picocell base station unit can effectively deteriorate the downlink quality of service at the edges of a macrocell.

It is desirable to configure a communication system to minimize or eliminate the impact of mutual interference between picocell base station units and macrocell base stations. This invention addresses that need.

SUMMARY OF THE INVENTION

An exemplary method of controlling wireless transmissions from a picocell base station unit within a macrocell comprises setting a transmission power of the picocell base station unit dependent on a position of the picocell base station unit within the macrocell.

One example includes the position is considered relative to a location of a macrocell base station or an edge of the macrocell.

One example includes determining an interference level in the vicinity of the picocell base station unit. The determined interference level provides an indication of a proximity between the picocell base station unit and the edge of the macrocell, for example. The transmit power of the picocell base station unit in one example is set based on the determined interference level.

In one example, the picocell base station unit has the ability to detect downlink transmissions from a macrocell base station for making the interference level determination. In another example, the picocell base station unit communicates with a mobile station within the picocell, which provides interference level measurements.

The various features and advantages of this invention will become apparent to those skilled in the art from the following detailed description. The drawings that accompany the detailed description can be briefly described as follows.

DETAILED DESCRIPTION

An example implementation of this invention described below includes the recognition that proximity between a picocell base station unit and an edge of a macrocell or a macrocell base station has a direct relationship to a desired transmit power used by the picocell base station unit. In a disclosed example, the transmit power of the picocell base station unit is set dependent on the position of the picocell base station unit within the macrocell. When a picocell base station unit is closer to the macrocell base station (e.g., the center or "heart" of the macrocell), the transmit power of the picocell base station unit is set relatively high. When the picocell base station unit is close to an edge of the macrocell (e.g., relatively far from the macrocell base station), the picocell base station unit transmit power is set relatively low. Such transmit power settings avoid interference and allow for the picocell and the macrocell to each include the desired coverage in the areas where they overlap and use the same channel frequency.

Figure 1:
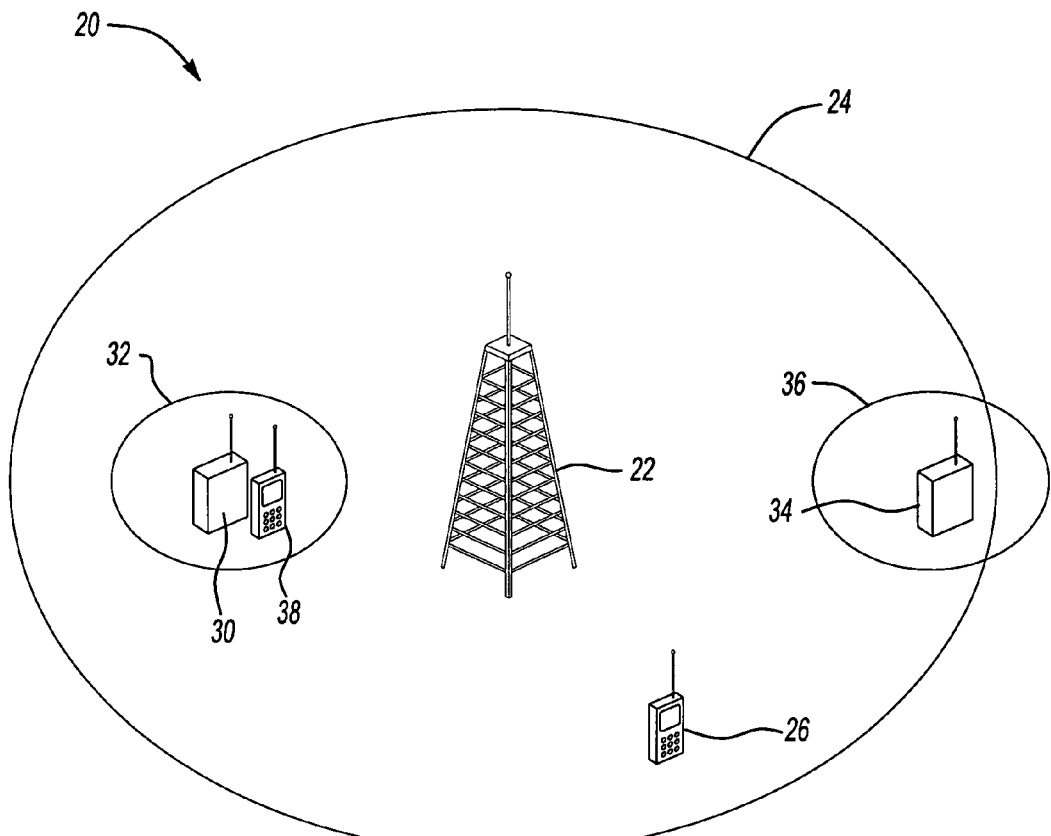
FIG. 1 schematically shows selected portions of a wireless communication system that is useful with an embodiment of this invention.

FIG. 1 schematically illustrates selected portions of a communication system 20. A base station 22 includes a base station transceiver unit and appropriate radio communication equipment for conducting wireless communications in a generally known manner. The base station 22 establishes a wireless communication coverage area 24 that is referred to as a macrocell for purposes of discussion. The geographic region of the macrocell 24 will depend on, in part, the capabilities of the base station 22 and the surrounding geography. There are known techniques for establishing a desired macrocell coverage area.

Within the macrocell 24 a mobile station 26 is capable of conducting wireless communications by communicating with the base station 22 in a known manner. Within the macrocell 24 there is a picocell base station unit (PCBSU) 30 that provides wireless communication coverage within a picocell 32. As can be appreciated from the illustration, the size of the coverage area of the picocell 32 is much smaller than that of the macrocell 24. In this example, the picocell 32 is contained entirely within the macrocell 24.

Another PCBSU 34 provides coverage within a corresponding picocell 36. In this example, the picocell 36 is at least partially within the macrocell 24.

As can be appreciated from the illustration, the PCBSU 30 is relatively closer to the base station 22 or the center of the macrocell 24 compared to the PCBSU 34. The PCBSU 34 is much closer in proximity to an edge of the macrocell 24 compared to the PCBSU 30.

One example embodiment of this invention includes the realization that the position of the picocell base station units within the macrocell 24 has a direct impact on a desired transmit power used by each picocell base station unit to avoid co-channel downlink interference.

For example, if the transmit power of the PCBSU 30 is set too low, a mobile station 38 within the picocell 32 will not be able to effectively receive downlink signals from the PCBSU 30 because of interference from downlink signals from the base station 22. At the same time, the PCBSU 34 may use a transmit power that is too high such that it would interfere with downlink communications between the base station 22 and a mobile station in the vicinity of the PCBSU 34 because the relative signal strength of the transmissions from the base station 22 near the edge of the macrocell 24 is lower. It is not possible, therefore, to set the PCBSU transmit power for every PCBSU within a macrocell to be the same. Instead, the disclosed example includes setting the transmit power of the PCBSUs based upon a position of the PCBSU within the macrocell.

Figure 2:
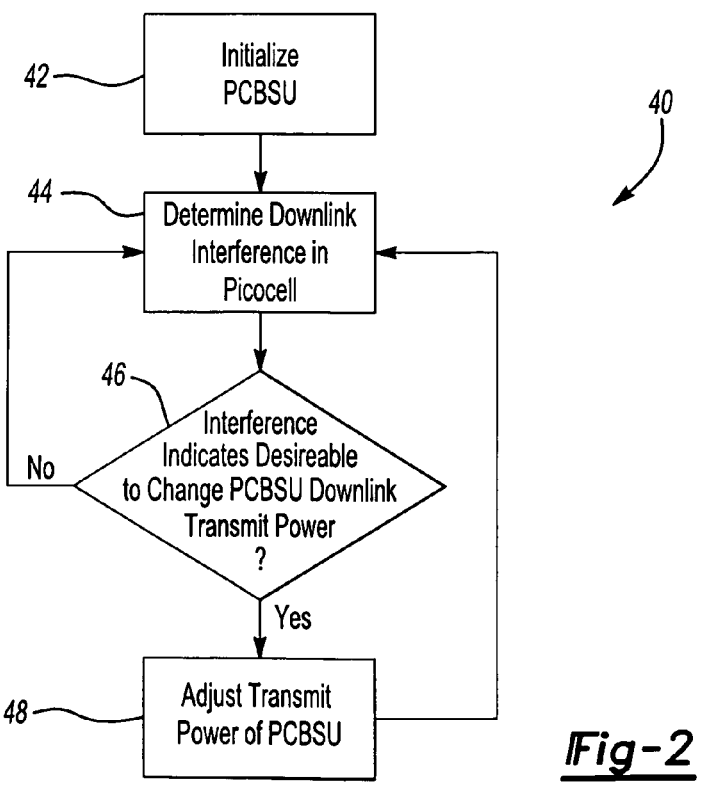
FIG. 2 is a flowchart diagram summarizing one example approach for controlling transmit power of a picocell base station unit.

The flowchart diagram 40 in FIG. 2 summarizes one example approach. In this example, each PCBSU is preset at a factory, for example, with a transmit power that provides a pre-defined level of downlink coverage or quality for mobile stations within the picocell supported by that PCBSU. Given this description, those skilled in the art will be able to select such a transmission power to provide a minimum desired picocell coverage level, for example.

At 42, the PCBSU is initialized when it is installed or powered up in the desired location. At 44, a downlink interference level is determined somewhere within the picocell. In one example, the PCBSU is equipped with a downlink receiver that can perform at least basic receiver functions of known mobile stations. At appropriate times, such as gaps in broadcast or data transmissions from the PCBSU, the PCBSU makes measurements of the downlink transmissions originating from nearby macrocell base stations. Given the relatively small size of the picocell, it is expected that the levels of interference measurements at the PCBSU will be similar to those experienced by mobile stations within the picocell.

As indicated at 46 in FIG. 2, a determination is made whether the measured interference level indicates that the transmit power of the PCBSU should be changed. The amount of interference will depend, at least in part, on the position of the PCBSU within the macrocell. For example, the PCBSU 30 in the example of FIG. 1 will likely detect a higher level of interference than the PCBSU 34 because the former is much closer to the base station 22 than the latter.

As shown at 48 in FIG. 2, the transmit power of the PCBSU is adjusted based upon the indication of the determined interference level. The determined interference level is related to the position of the PCBSU within the macrocell 24. In this regard, the determined interference level provides at least some indication of the position of the PCBSU within the macrocell and provides a basis for adjusting the transmit power accordingly. In a situation where the PCBSU is experiencing relatively high and undesirable interference (e.g., close to the base station 22), the transmit power of the PCBSU preferably is increased. On the other hand, where relatively low interference levels are detected (e.g., near the edge of the macrocell 24), the PCBSU may decrease the transmit power to minimum levels for providing coverage within the picocell and to minimize the amount of interference experienced by any macrocell mobile stations within the vicinity of the PCBSU.

One example includes determining a threshold interference level or range of interference levels that indicate when the transmission power of the PCBSU should be adjusted. Given this description, those skilled in the art will be able to determine what an appropriate interference level is to achieve acceptable picocell performance and acceptable macrocell performance, given their particular situation. Once such a threshold level or range of levels has been set, a PCBSU can be appropriately programmed to determine when the transmit power of that PCBSU should be adjusted up or down depending on the relationship between the determined interference level and the predetermined threshold level or range of levels.

In one example, appropriate transmit levels for PCBSUs are set based on empirical data collected within a macrocell. The appropriate adjustments or settings in one example are pre-programmed into the PCBSU. In another example, a macrocell base station broadcasts information from which a PCBSU can determine an appropriate setting to correspond to a current interference level.

As schematically shown in FIG. 2, the determination regarding macrocell base station interference within a picocell may be conducted on a periodic basis to make further changes to the picocell transmit power.

In one example, the PCBSU does not make its own interference level determinations. In this example, instead, the PCBSU signals at least one mobile station within the corresponding picocell to make downlink interference measurements. The measurements made by the mobile station are reported to the PCBSU, which then uses them for making an adjustment to the transmit power of the PCBSU.

In one example, the identity of a macrocell base station from which downlink interference is determined is signaled to the PCBSU by a network over a wire line backhaul. For example, the scrambling code or PN offset associated with a macrocell base station can provide an indication of the macrocell base station so that the PCBSU knows which base station the downlink interference is being measured from. This can be useful in embodiments, for example, where a picocell BSU may detect downlink signals from more than one macrocell base station.

One unique feature of the disclosed example is that a PCBSU may make its own downlink interference measurement or gather such information from a mobile station within the corresponding picocell regarding downlink interference originating from nearby macrocell base station and use that determination for automatically adapting or adjusting the PCBSU transmit power. The transmit power for the PCBSU broadcast and data transmissions may be controlled independently or together, depending on the needs of a particular situation.

One way in which the disclosed example is different from previous power control mechanisms in wireless communication systems is that with the disclosed example, the power control is based upon interference measurement at the transmitter (e.g., the PCBSU). Traditionally, power control mechanisms have included adjustments at a transmitter based upon measurement reports and control commands from a receiver located remotely from the transmitter. This has been due to the fact that interference environment at a receiver location typically can be substantially different from that at the transmitter. In the picocell type arrangement described above, however, power adjustments at the transmitter are based on measurements of interference made at the transmitter or in very close proximity to the transmitter.

The adaptive transmit power control technique of the disclosed example facilitates effective communications within picocells within a macrocell. Downlink interference within the picocell and in the macrocell can be minimized or eliminated when employing the techniques of the disclosed example embodiment.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of controlling wireless transmissions from a picocell base station unit (PCBSU) within a macrocell, comprising:
    setting a transmission power of the PCBSU dependent on a location of the PCBSU within the macrocell;
    determining an interference level within the picocell using the PCBSU; and
    setting the transmission power responsive to the determined interference level.

2. The method of claim 1, comprising:
    using an initial, preset transmit power for the PCBSU; and
        i) increasing the transmit power if the PCBSU is relatively close to a center of the macrocell; or
        ii) decreasing the transmit power if the PCBSU is relatively close to an edge of the macrocell.

3. The method of claim 1, wherein a relatively higher determined interference level corresponds to increasing the transmit power of the PCBSU and a relatively lower determined interference level corresponds to decreasing the transmit power of the PCBSU.

4. The method of claim 1, comprising
    determining the interference level on a channel used by the PCBSU for downlink transmissions from the PCBSU.

5. A picocell base station unit, comprising
    a transmitter having a transmit power that is adjusted based upon a position of the picocell base station unit within a macrocell, the picocell base station unit independently determining an interference level within the picocell and setting the transmit power responsive to the determined interference level.

6. The picocell base station unit of claim 5, wherein the transmit power has an initial, preset level and the picocell base station unit automatically
    i) increases the transmit power from the initial, preset level if the picocell base station unit is relatively close to a center of the macrocell; or
    ii) decreases the transmit power from the initial preset level if the picocell base station unit is relatively close to an edge of the macrocell.

7. The picocell base station unit of claim 5, wherein the picocell base station unit
    determines the interference level by communicating with a mobile station within the picocell that provides an indication of the interference level.

8. The picocell base station unit of claim 5, wherein a relatively higher determined interference level corresponds to increasing the transmit power and a relatively lower determined interference level corresponds to decreasing the transmit power.

9. The picocell base station unit of claim 5, wherein the picocell base station unit
    determines the interference level on a channel used for downlink transmissions from the picocell base station unit.

* * * * *